United States Patent [19]

Kayser et al.

[11] Patent Number: 4,648,486
[45] Date of Patent: Mar. 10, 1987

[54] APPARATUS FOR LUBRICATING A MOVING CHAIN

[75] Inventors: John P. Kayser; Philip J. Kast, both of Madison, Wis.

[73] Assignee: Madison-Kipp Corporation, Madison, Wis.

[21] Appl. No.: 659,365

[22] Filed: Oct. 10, 1984

[51] Int. Cl.$^4$ .................. F16N 7/24; F16N 13/22; F16N 11/10

[52] U.S. Cl. .................. 184/15.1; 184/15.3; 184/17; 184/29; 417/401; 417/435

[58] Field of Search ............. 184/15.1, 15.2, 15.3, 184/16, 17, 3.17, 3.2, 29; 417/401, 435, 225, 349

[56] References Cited

U.S. PATENT DOCUMENTS

| | | | |
|---|---|---|---|
| 3,031,033 | 4/1962 | Burrows | 184/15.1 |
| 3,116,810 | 1/1964 | Olson | 184/15.1 |
| 3,599,753 | 8/1971 | Walsh | 184/15.2 |
| 3,869,023 | 3/1975 | Thomson | 184/15.2 |
| 4,085,821 | 4/1978 | Kast | 184/15.2 |
| 4,271,930 | 6/1981 | Thomson | 184/15.2 |
| 4,425,986 | 1/1984 | Wedlin | 184/3.2 |
| 4,444,292 | 4/1984 | Brown | 184/6.22 |
| 4,506,763 | 3/1985 | Frost | 184/15.2 |

Primary Examiner—Carlton R. Croyle
Assistant Examiner—Jane E. Obee
Attorney, Agent, or Firm—Marshall, O'Toole, Gerstein, Murray & Bicknell

[57] ABSTRACT

An automatic lubricator for chain conveyors with a pivoting arm having a roller contacting the chain and moving between the chain side links to place lubricating nozzles along the chain center line. A magnetic proximity sensor on the pivoting arm activates the fluid pump when the nozzles are in position to deliver lubricating fluid to the chain pins. Improved metering pump apparatus diverts fluid from the metering pump to a fluid return line immediately at the end of a lubrication cycle. The metering pump chamber is then primed for the next cycle. Drippage from the lubrication nozzles is eliminated.

2 Claims, 8 Drawing Figures

APPARATUS FOR LUBRICATING A MOVING CHAIN

This invention relates to automatic lubricator devices and in particular to such automatic lubricator devices for chain conveyor systems.

BACKGROUND OF THE INVENTION

Reference may be made to the following U.S. Pat. Nos. of interest: 3,869,023; 3,895,690; 4,024,930; 4,085,821; 4,271,930; 4,274,509; 4,368,803.

Automatic chain lubricating devices are used extensively in industry for automatically applying lubricant under pressure to a particular point of the chain system. The various types of commercially available chain lubricating devices can be classified as either a moving lubricator nozzle device or fixed lubricator nozzle device.

Fixed lubricator nozzle devices include fixed lubricator nozzles rigidly mounted to the conveyor track with the lubricant being timed for application to the desired conveyor point by means of a control system actuated by a sensor which detects passage of a particular portion of the conveyor.

In contrast, in moving lubricator nozzle devices, the moving nozzle is controlled in a path to advantageously place the nozzle and the lubricant shot near the conveyor point desired to be lubricated while avoiding conveyor attachments which could damage the nozzles. Such moving nozzle devices utilize a mechanical interface to synchronize movement of the nozzle to the conveyor. While such moving lubricator nozzle systems are more accurate than fixed lubricator nozzle systems, they generally require more maintenance due to the increased number of components and to the complexity of the required mechanical interface equipment.

Commercially available moving nozzle lubricators are known. One such mechanism manufactured by Madison-Kipp Corporation of Madison, Wis., assignee of the present invention, moves the lubricating nozzles in a cycloidal path, the points of which pass above a conveyor chain. The lubricating nozzles are attached to a caterpillar chain mechanism which properly synchronizes the cycloidal period to the speed of the conveyor chain. The caterpillar chain mechanism is automatically engaged with the conveyor chain by a pneumatically actuated cylinder when a lubrication cycle is necessary. A plate mounting the nozzles physically actuates a fluid trip valve when the nozzle is moved into position and enables the lubricating fluid to be delivered to the nozzle.. This moving nozzle lubricator device functions satisfactorily, but is complex and has many components which require maintenance.

The second commercially available moving nozzle lubricator is similar to the aforementioned Madison-Kipp Corporation device in that it also employs a caterpillar chain synchronizing mechanism and physical actuation of a fluid trip valve, but with the cycloidal action modified to effect a longer "dwell time"—i.e., the time during which the moving nozzle is in position adjacent the desired conveyor point to be lubricated. The modification, however, makes this second commercial unit even more mechanically complex than the first mentioned commercial unit and therefore increases rather than reduces the number of components requiring maintenance.

In a third commercially available moving nozzle lubricator, nozzles are formed by drilling apertures into sprocket teeth which engage the chain during chain movement. A fluid trip valve is physically actuated when the sprocket teeth are moved during positioning. Although the nozzles formed by the apertures are close to the chain, the axial direction of the nozzles are not toward the desired target area to be lubricated on the chain. Also, since most conveyor chains are in an industrial environment subject to dust and dirt, the nozzles can become quickly blocked, requiring periodic maintenance.

Accordingly, it is desired to provide a lubricating device and in particular a moving nozzle lubricating device which obviates the need for caterpillar chains and sprockets and thereby reduces maintenance problems. In addition, it is desired to provide such a device having as few components as possible in order to reduce the complexity of currently available commercial devices of this type.

It is also desired to provide an automated lubricator system which can reliably deliver clean shots of lubricating fluid and substantially prevent lubricating fluid drippage from the nozzles. Presently, air in the fluid lines, the normal expansion of fluid and of the system components, a "pumping action" during shuttling or deactivation of the actuable fluid solenoid valves normally employed, and the inherent interconnection of all three ports of such solenoid valves at an instantaneous point in time during operation since they are an imperfect diverter valve, all contribute to reduce the ability to obtain clean shots and to enhance fluid drippage. The solution to these problems is made more complex due to the small volume amount of fluid delivered in each shot—ranging from about 0.002 to 0.004 cu. in.

SUMMARY OF THE INVENTION

In accordance with the principles of the present invention, there is provided an automatic lubricating device for chain conveyors which includes a pivoting arm having a roller at one end for contacting the chain center links and which can move between the chain side links to place one or more lubricating nozzle substantially along the center line or longitudinal axis of the chain to deliver lubricating fluid to the desired points on the chain. A position sensing mechanism mounted on the pivoting arm determines when the nozzles are in position and activates the lubricating fluid pumping system to deliver a specified quantity of fluid to the chain. The pivoting arm provides synchronization of movement of the conveyor chain to the lubricator nozzles and is spring biased inwardly with the roller directed towards the chain.

A platform portion of the pivoting arm includes means for mounting the roller and lubricating nozzles at one end and means for pivotally mounting the other end of the platform portion with respect to the conveyor chain. A magnetic proximity switch mounted on a fixed plate cooperates with an indicator post on the pivoting platform to activate the lubricating pump when the roller has moved into the side link chain portion so that the proximity switch senses the indicator post.

Accordingly, in accordance with one aspect of the present invention, a moving nozzle type lubricator for conveyor chains is provided with relatively few parts and of easily manufactured components. Thus, the maintenance of this unique lubricating mechanism is significantly reduced compared to prior art mechanisms.

In accordance with another aspect of the present invention, there is provided an improved lubricating fluid metering pumping apparatus wherein a metering pump includes a pumping chamber with an outlet connected to the lubricating nozzle, and an actuable fluid valve controlling the flow of fluid from a reservoir/pump to the metering pump. Means are provided to enable fluid passage from the pumping chamber to the nozzles, and to selectively prevent such fluid passage immediately at the end of the lubrication cycle so that a clean shot of lubricating fluid is delivered during the lubrication cycle and dripping from the nozzles is substantially eliminated. A piston cylinder is provided in the metering pump to divert fluid from the pumping chamber at the end of the lubrication cycles.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
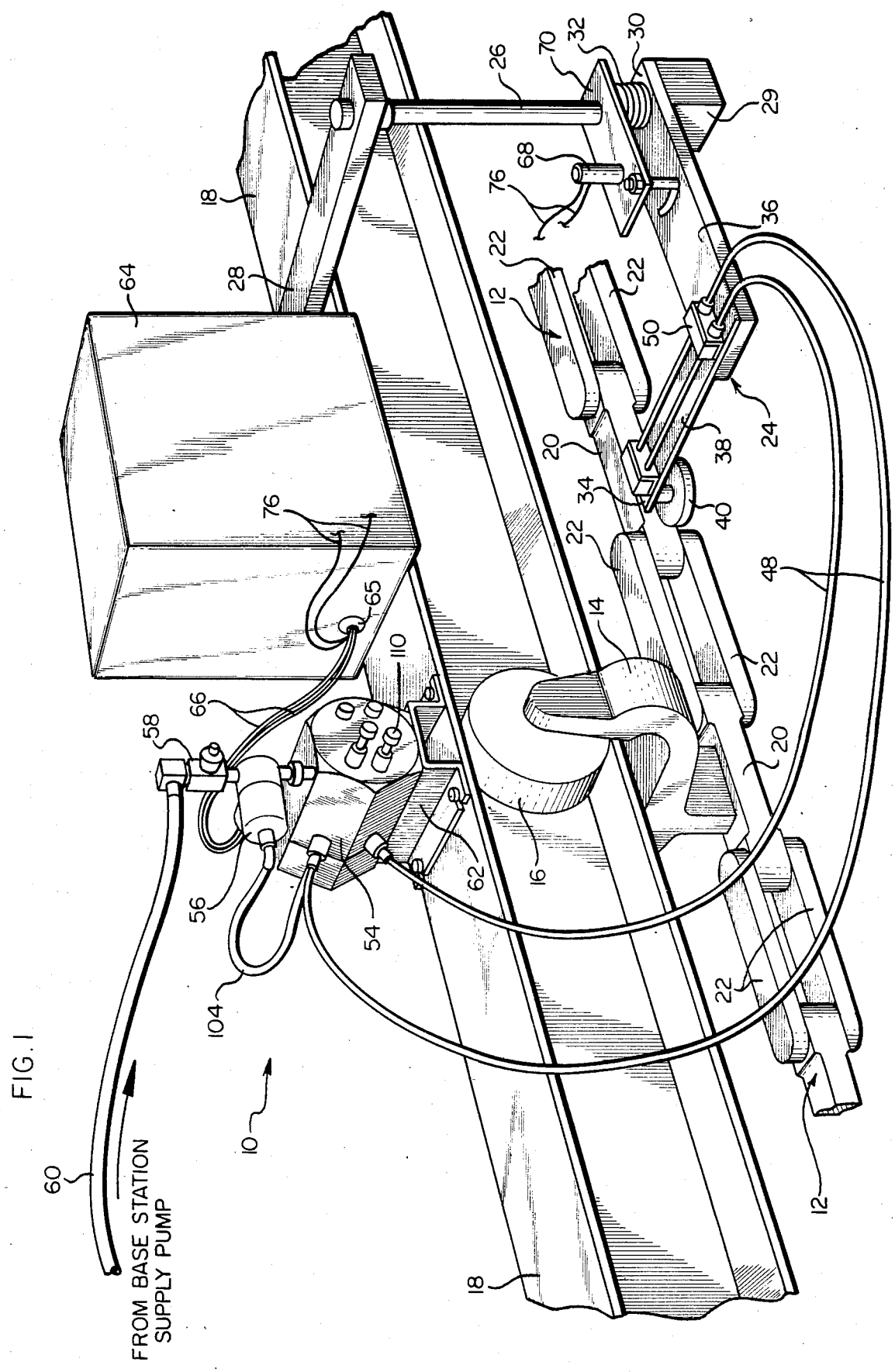
FIG. 1 is a perspective view of the automatic chain lubricator device in accordance with the principles of the present invention.

FIG. 1 illustrates a perspective view of an automatic chain lubricator 10 in accordance with the principles of the present invention for lubricating a chain conveyor 12. Chain conveyor 12 is mounted by a chain support 14 and roller 16 for movement on a supporting I-beam 18. The conventional chain mechanism includes chain support 14 mounted to a chain center link 20 and with chain side links 22 connected to the center links through suitable connecting pins or chain pins 23 (see FIG. 3). The chain pins normally require periodic lubrication.

Figure 5:
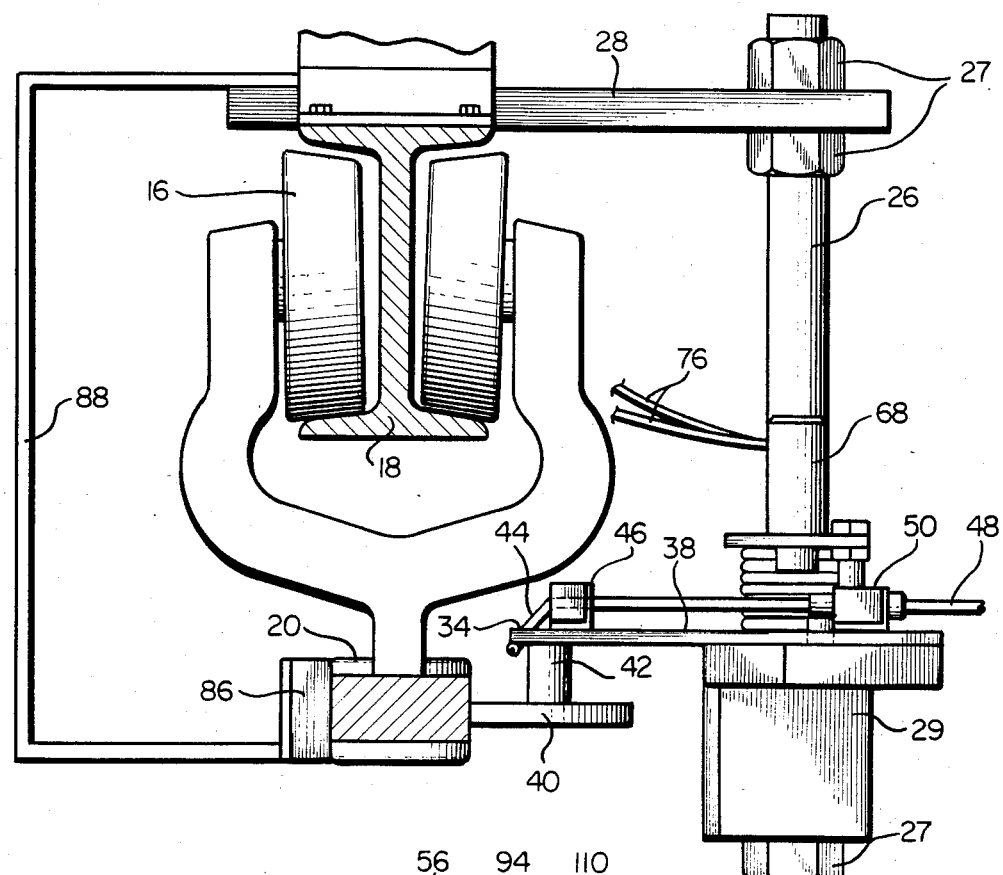
FIG. 5 is a fragmentary side elevational view of the pivoting platform arm illustrating the nozzles being moved away from the chain conveyor as in FIG. 4.

To provide such required periodic lubrication to the chain pins, automatic lubricating device 10 includes a platform arm 24 pivotally mounted on a rod 26 which in turn is rigidly mounted by a support arm 28 to the I-beam. Rod 26 may be threaded at its ends for threadable engagement with suitable nuts 27 at the top and nut 27 and bearing block 29 at the bottom as shown in FIG. 5 to support platform arm 24 at platform arm end 30 adjacent chain 12. Bias means such as a spring 32 are provided with one spring end fixed in position and the other spring end mounted to platform arm 24 such that spring 32 biasingly urges an opposite platform arm end 34 towards chain 12 so as to be immediately adjacent and in contact with chain center link 20.

Figure 2:
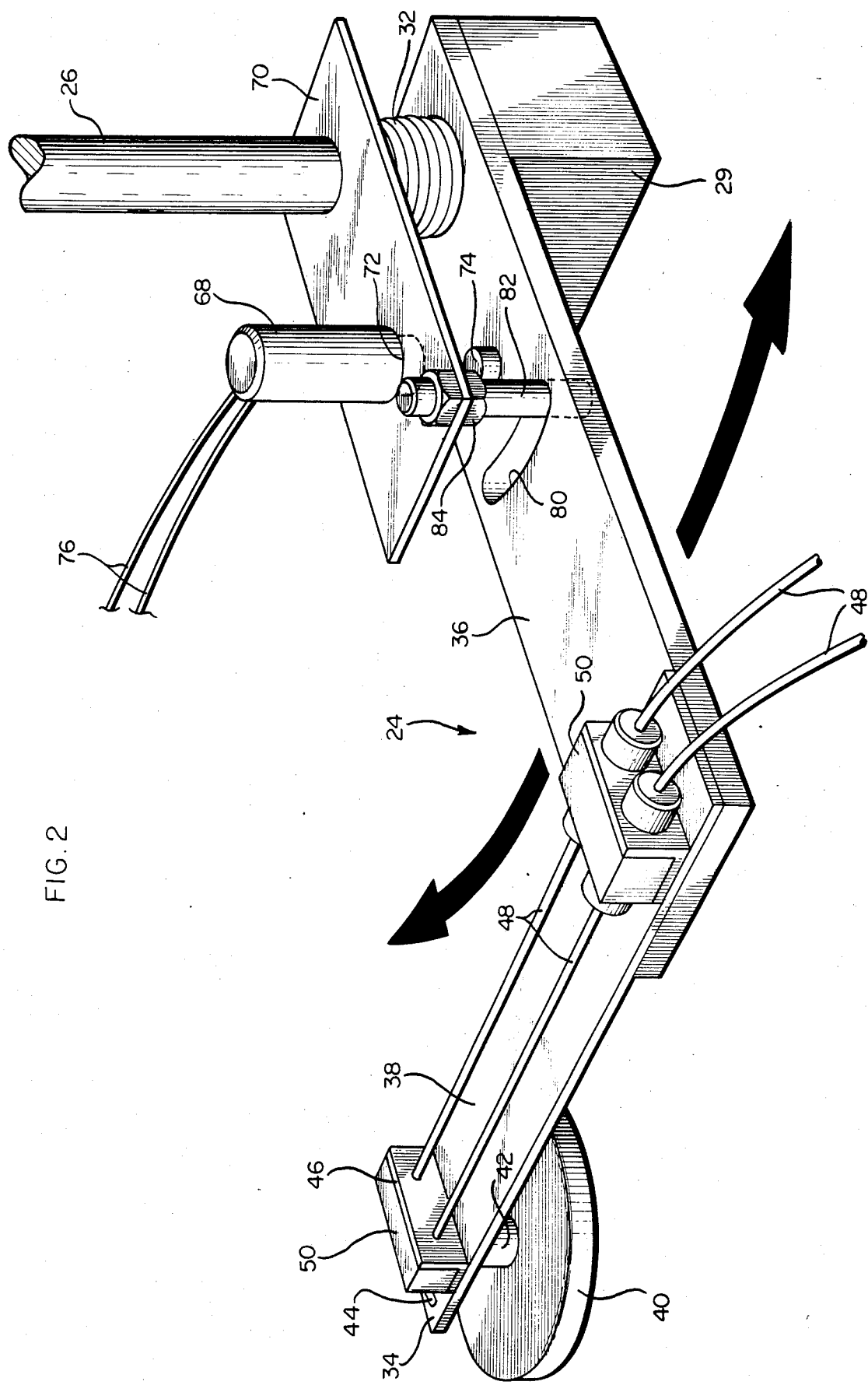
FIG. 2 is a fragmentary perspective view of a portion of the chain lubricator of FIG. 1, illustrating the pivoting platform arm portion thereof.

The platform arm is formed with a first plate 36 joined at one end to second plate 38 as shown most clearly in FIG. 2. While plates 34 and 36 may be welded together, it is preferred that instead, they be mounted together with nuts and bolts with one of the plates having a slot so that the plates can be adjustably positioned before being securely attached to each other. Thus, adjustable mounting of plate 38 on plate 36 permits adjustable mounting of plate end 34 with respect to chain 12. A contact roller 40 is rotatably mounted by shaft 42 to end 34 of plate 38 so that roller 40 can contact chain center link 20 under the bias of spring 32.

A pair of lubricating nozzles 44 are suitably mounted by a mounting bracket 46 at platform end 34. Nozzles 44 are positioned so as to face in opposite directions as shown most clearly in FIGS. 3 and 4, so that the nozzles will be held substantially on the center line or longitudinal axis of chain 12 when roller 40 moves between side links 22 under urging of spring 32 in the lubrication position illustrated in FIG. 3. In this lubrication position, the nozzles can direct a clean shot of lubricant to chain pins 23. Lubricating fluid lines 48 are attached to the nozzles 44 and are mounted by suitable pass-through mount 50. The other end of fluid lines 48 are connected to a supply of lubricating fluid via a metering pump 54, a solenoid control valve 56, velocity control valve 58 and an inlet fluid line 60. Inlet line 60 is in turn connected to a base station supply pump and a reservoir of lubricating fluid so that a reasonably constant pressure of lubricating fluid is conducted on line 60 to velocity flow control 58.

As illustrated in FIG. 1, a mounting bracket 62 is mounted to metering pump 54 so as to secure the pump to the I-beam. In addition, a control unit enclosure 64 mounted on the I-beam encloses electrical apparatus and through electrical lines 66 activates solenoid valve 56 in response to a sensing means sensing that the lubricating nozzles are in the position shown in FIG. 3.

Sensing of the position of platform end 34 and therefore the nozzles 44 with respect to chain pins 23 on chain 12 is provided by a magnetic sensing proximity switch 68 mounted on plate 70 which is rigidly attached to rod 26. Plate 70 includes an aperture 72 at proximity switch 68 so as to sense the position of a metallic indicating post 74 projecting upwardly from plate 36. Electrical lines 76 extend from the proximity switch through grommet 65 and are suitably coupled to the electrical apparatus within enclosure 64.

Figure 3:
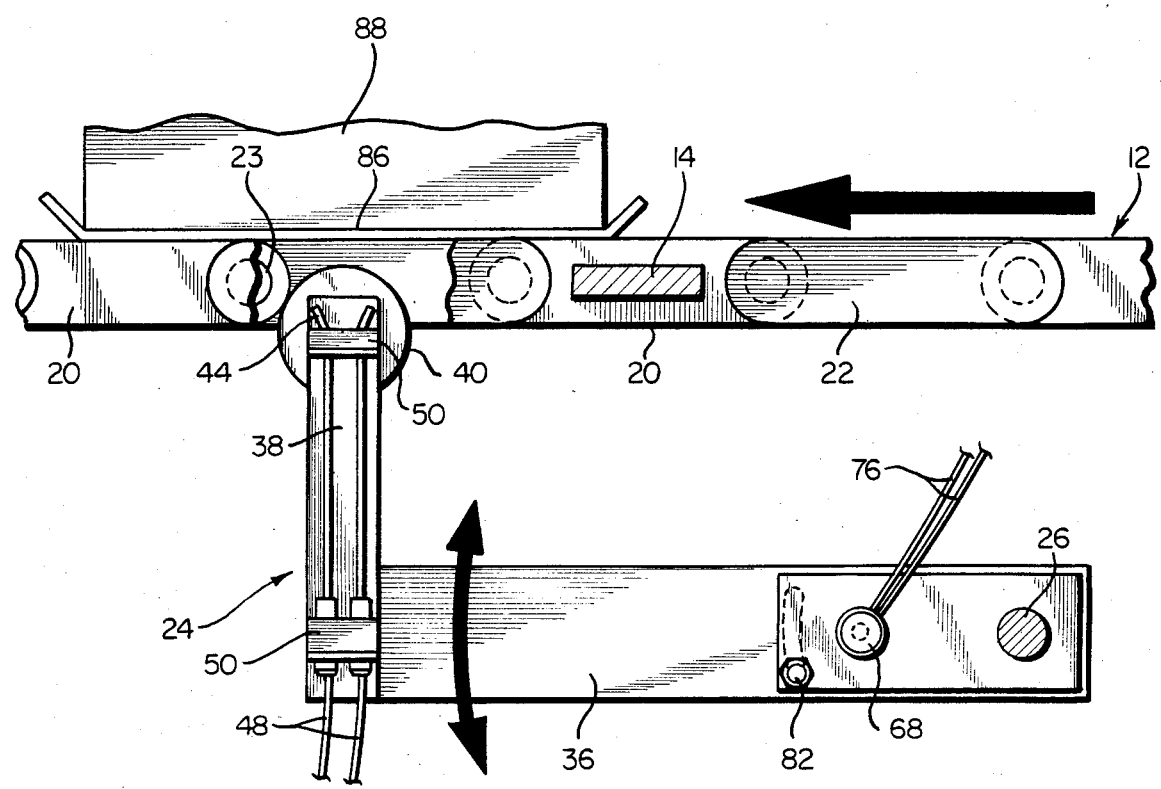
FIG. 3 is a top-plan view illustrating the lubricating nozzles in position near the center line of the moving chain supplying lubricating fluid to the desired lubrication points.
Figure 4:
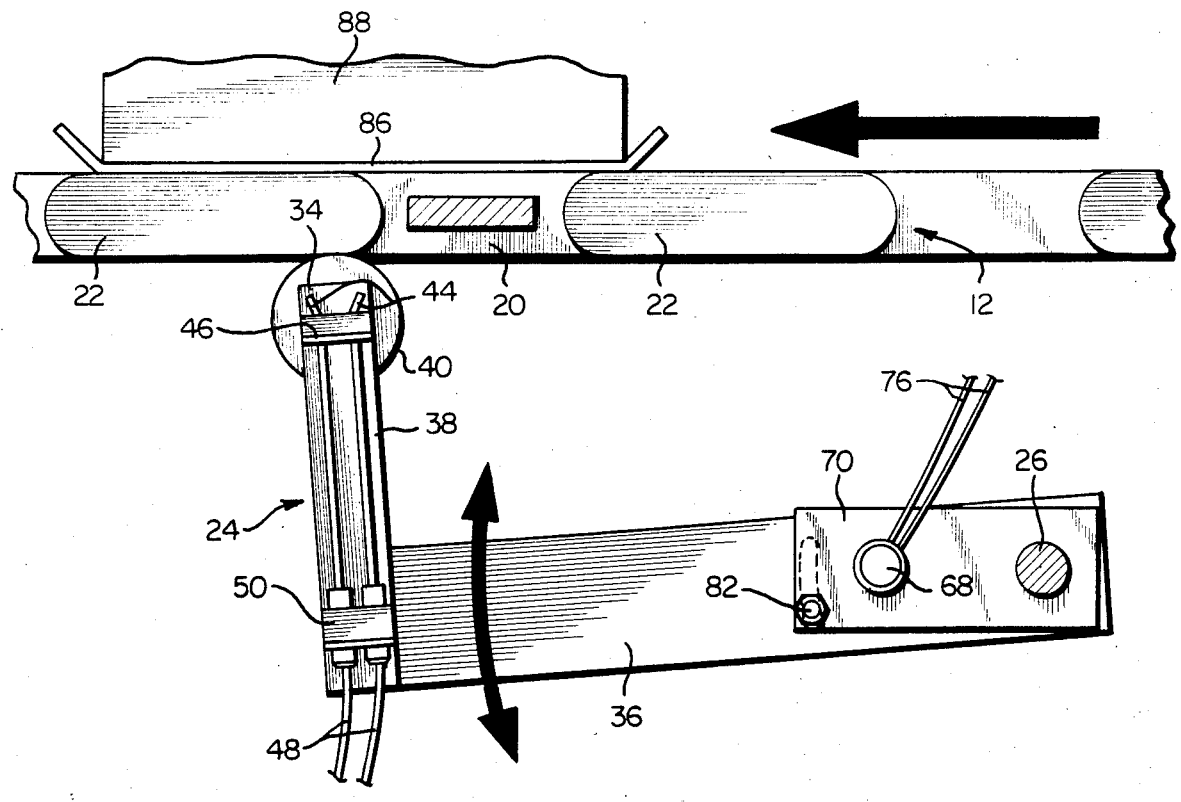
FIG. 4 is a top plan view similar to that of FIG. 3 illustrating the pivoting platform arm being pivoted away from the chain conveyor.

Operation of proximity switch 68 with respect to movement of pivoting platform arm 24 is illustrated in FIGS. 3 and 4. As chain 12 moves in the direction indicated in FIG. 4, roller 40 contacts center link 20 to pivot the arm 24 away from chain 12 in the position shown in FIG. 4. It may be noted that in this non-lubricating position, indicating post 74 on plate 36 is not directly in line under proximity switch 68 so that no actuating signal is presented on electrical lines 76. Therefore, solenoid valve 56 is not operated.

As the chain 12 continues to move, roller 40 extends into the space between side links 22 as shown in the lubricating position of FIG. 3 under the urging of the bias of spring 32. This places nozzles 44 substantially along the center line of chain 12 and in lubricating position with respect to chain pins 23. In the lubricating position of FIG. 3, it may be noted that indicating post 74 (See FIG. 2) is now directly under and in line with proximity switch 68 so that the switch is actuated and a signal is presented on electrical lines 76 to actuate solenoid valve 56 through the electrical apparatus in enclosure 64.

An arcuate slot 80 in plate 36 cooperates with a stop rod 82 mounted by nuts 84 to plate 70 and extending downwardly from plate 70 through slot 80 and below plate 36. Accordingly, as shown in FIG. 3, as the pivoting arm 24 is biasingly urged towards chain 12, slot 80 in plate 36 moves with respect to fixed rod 82 in plate 70 until the rod abuts against the end of the slot as shown in FIG. 3. This reliably positions the nozzles 44 in the lubricating position shown in FIG. 3.

If required, a backing plate 86 located on the chain side opposite of roller 40 can be provided as a backing support to the chain to prevent the chain from moving away from the roller 40. In systems where the chain does not sway excessively, the use of backing plate 86 is not necessary. Backing plate 86 is maintained in position adjacent the chain by means of a C-shaped bracket 88 mounted at one end to I-beam 18 and at the other end to backing plate 86 as shown in FIG. 5.

Figure 8:
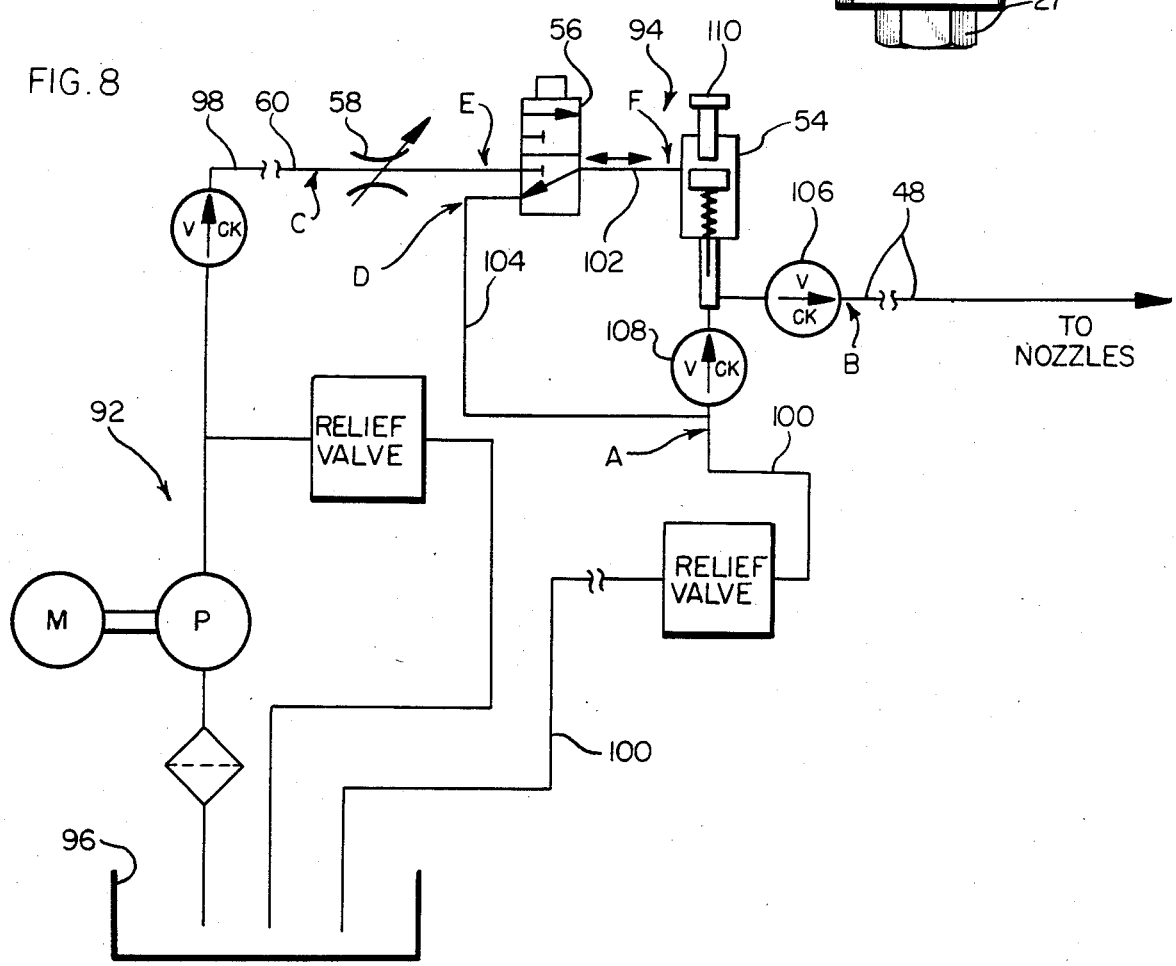
FIG. 8 is a schematic hydraulic flow diagram illustrating the fluid lines interconnecting the components of the present invention.
Figure 6:
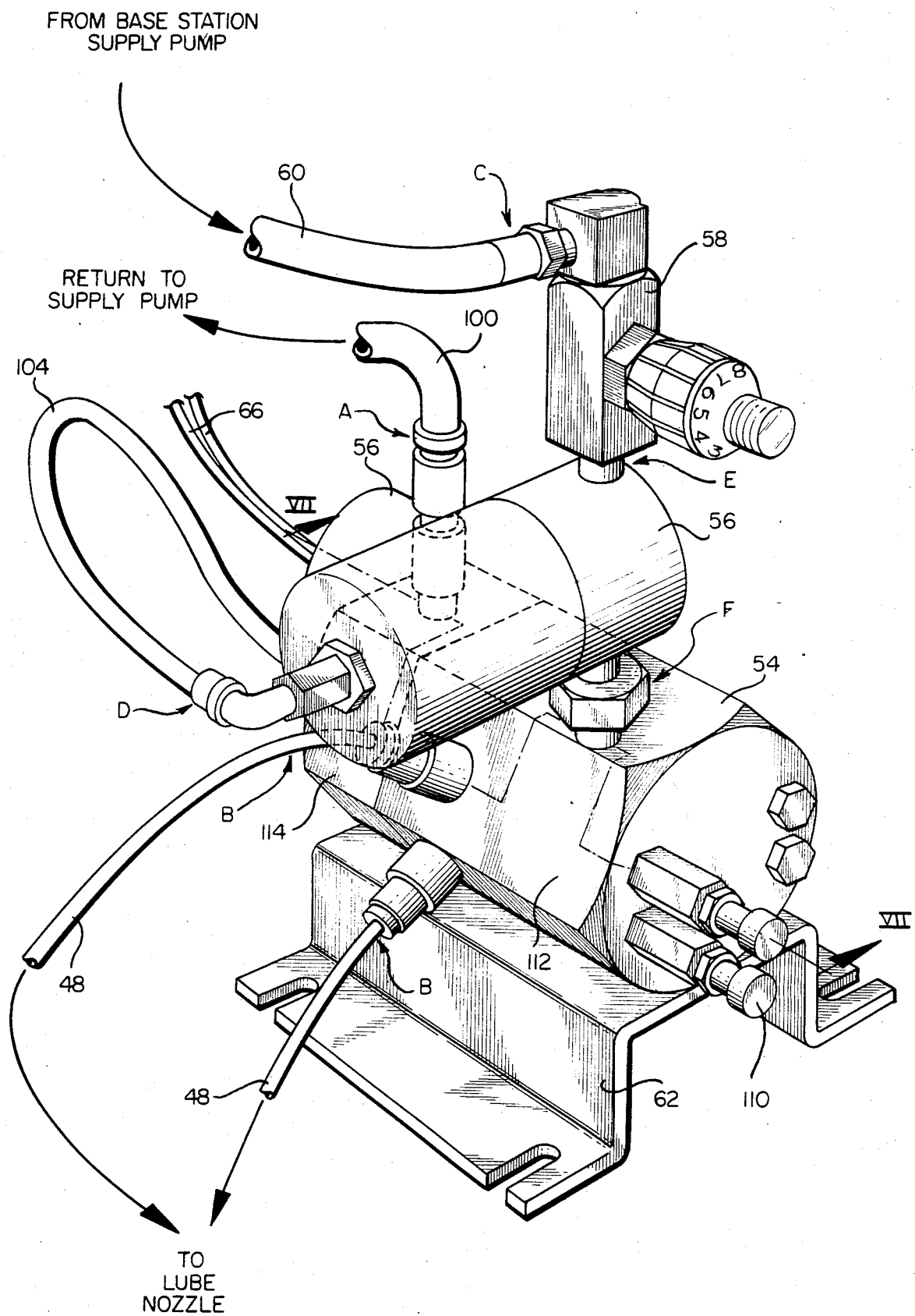
FIG. 6 is a perspective view of improved lubricating fluid metering pumping apparatus in accordance with another aspect of the present invention to deliver clean shots of lubricating fluid to the chain conveyor without dripping from the nozzles.
Figure 7:
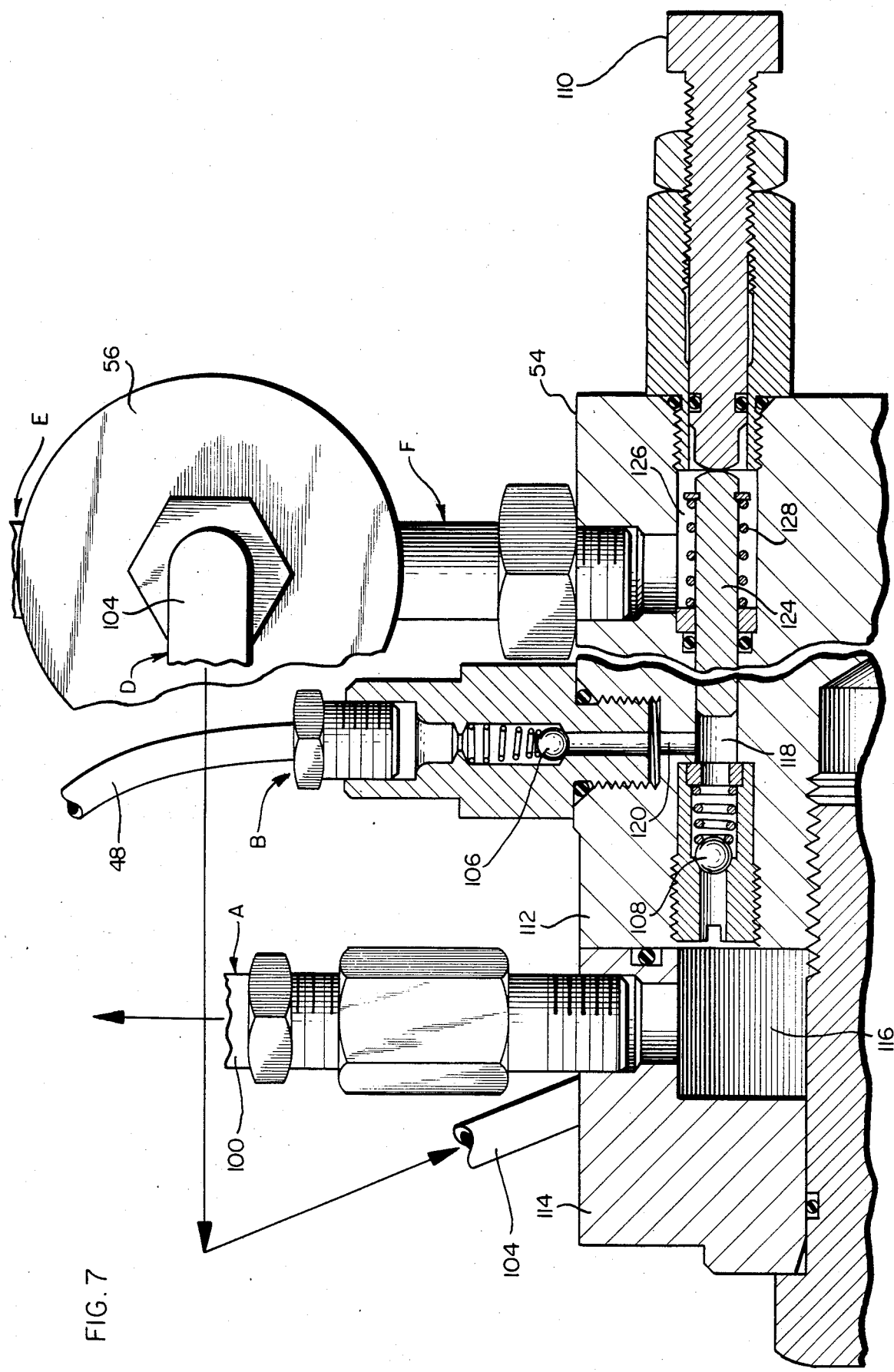
FIG. 7 is a fragmented sectional view taken along section lines VII—VII of FIG. 6 and illustrating the construction of a metering pump in accordance with the present invention.

FIGS. 6–8 illustrate an improved metering pump apparatus for delivering clean shots of lubricating fluid from a pressurized fluid reservoir to the lubricating nozzles. In particular, the improved metering pumping apparatus enables any air in the fluid supply line to be diverted back to the fluid reservoir and thus substantially prevents any air bubbles from entering the lubricating output lines to the lubricating nozzles. In addition, prior art problems due to the normal expansion of system components and of the lubricating fluid, due to the normal "pumping action" of fluid solenoid valves used in the system, and due to the imperfect diverter valve aspect of such solenoid valves have been overcome. Thus, drippage of oil from the nozzles is substantially eliminated and the delivery of clean shots of metered amounts of lubricating fluid from the nozzles to the lubricating points on the chain is assured.

Reference initially may be made to FIG. 8 showing a hydraulic schematic diagram with the hydraulic lines interconnecting a base pumping station 92 connected to metering pump apparatus 94 which in turn is connected to lubricating nozzle 44. Base station 92 includes a conventional pump motor and supply pump, a relief valve for relieving excessive pressure, and a check valve supplying substantially constant pressure of about 300 psi (or typically in the range of 150–750 psi) to the base station fluid output line 98. Line 98 is in turn connected to fluid line 60 at the input to the metering pump apparatus. The output of metering pumping apparatus 94 connects through fluid output lines 48 to the lubricating nozzles 44.

In accordance with the principles of the present invention, in metering pump apparatus 94, there is provided means for diverting fluid in metering pump 54 at the end of a lubrication cycle to reservoir 96 via a return line 100. The metering pump apparatus includes a solenoid valve 56 and a metering pump 54 interconnected through two-way fluid line 102 for returning any fluid and air in the metering pump through a connecting fluid line 104 to the return line 100. Solenoid valve 56 is a commercially available three-way fluid valve which when actuated passes fluid from line 60 to the metering pump, and when deactivated or shuttled, connects fluid line 102 to line 104. Accordingly, return line 100 returns any lubricant and air to reservoir 96 which is an important feature to eliminate the following problems in commercially available three-way fluid values as solenoid value 56. Such valves inherently provide an undesired "pumping action" during shuttling which tends to force fluid into the metering pump thereby leading to dripping from the nozzles. Also, such valves are imperfect diverter valves so that at an instantaneous point in time all three valve ports are undesirably interconnected which leads to fluid dripping from the nozzles. The present invention has eliminated these prior art problems.

Pump body 54 includes check valves 106 and 108 as illustrated in FIG. 8 and as will be more particularly described in connection with the structure shown in FIGS. 6 and 7. In addition, adjustment means 110 are provided on the metering pump to variably adjust the desired amount of lubricant supplied during each shot. Velocity control 58 is provided to adjust the velocity of the lubricant shot.

With reference now to FIGS. 6 and 7, the metering pump apparatus structure and interconnections in accordance with the schematic diagram of FIG. 8 can be described. Specifically, FIG. 7 illustrates pump body 54 as including a main body portion 112 and a manifold portion 114. Manifold 114 includes a central cavity 116 which communicates with return line 100 and also with fluid line 104 which in turn is connected to solenoid valve 56. It is understood of course that in FIG. 7, fluid line 104 connects to a suitable opening or port around the perimeter of manifold 114, which port communicates with cavity 116 inside the manifold in a manner similar to that shown for the connection of fluid line 100 to the manifold.

For convenience in correlating the various points in the structure of FIGS. 6 and 7 with the hydraulic schematic of FIG. 8, alphabetic character references have been utilized. It is to be understood that the reference alphabetic characters are for purposes of assisting in the description and correlation with the structure with the schematic and may therefore be used to generally locate similar points in the drawings and in particular the entry or exit ports in the metering pumping apparatus.

Metering pump body portion 112 includes a pump chamber 118 which communicates with passageway 120 through a ball check valve 106 to nozzle output line 48. Metering pump piston 124 is located for slidable action within cylinder-chamber 126 with the chamber in turn being connected to input line 60 from the base station supply pump through solenoid valve 56 and velocity flow control 58. Spring 128 biases piston 124 towards the right in FIG. 7 until the right hand end of piston 124 abuts against the end of threaded adjustment screw 110. As is readily apparent, rotation of threaded screw 110 adjustably increases or decreases the volume within pumping chamber 118 which in turn adjustably controls the amount of lubricating fluid delivered during each lubricating operation. On the opposite side of chamber 118, there is provided a check valve 108 for controlling fluid communication between cavity 116 in manifold 114 and pumping chamber 118 such that the flow of fluid can only go from cavity 116 into cavity 118.

The following describes the operation of metering pump apparatus 94. Initially, the system is operated several times in order to eliminate any air in the lines and to prime pumping chamber 118 with lubricating fluid. Thus, initially, with each operation of solenoid valve 56, a pressurized source of fluid is delivered from base station output 98 through line 60 and into chamber 126 to force piston 124 to the left in FIG. 7 to initially expel air and any fluid through line 48. When the solenoid valve deactivates, spring 128 forces fluid in cylinder-chamber 126 upwardly through solenoid valve 56, line 104, cavity 116, check valve 108 and into pumping chamber 118. This action primes chamber 118 with lubricating fluid, and any air from the input lines is then returned from cavity 116 through return line 100 to reservoir 96. After chamber 118 has been properly primed, the unit is ready for operation. With each operation of solenoid valve 56 initiated by proximity sensor 68 when nozzles 44 are in the lubricating position of FIG. 3, pressurized fluid is supplied to chamber 126 forcing piston 124 to the left in FIG. 7 thereby forcing fluid in pumping chamber 118 out lines 48 to deliver a clean shot of lubricant through nozzles 44 to chain links 23. When the solenoid valve deactivates, line 102 is connected to line 104 and spring 128 overcomes any slight residual pumping action of the solenoid valve during deactivation to effectively disconnect pumping chamber 118 from the fluid source and to divert the fluid source from the metering pump to return line 100. Chamber 118 is then primed and ready for the next lubrication cycle.

Accordingly, only clean shots of lubricating fluid are delivered to the system. In addition, drippage from nozzles 44 commonly encountered with prior art systems is eliminated. Rather than the magnetic proximity switch, other types of non-contacting sensors and switches can be employed and mounted on platform arm 24, such as a photoelectric device and the like.

The foregoing detailed description has been given for clearness of understanding only, and no unnecessary limitations should be understood therefrom, as modifications will be obvious to those skilled in the art.

What is claimed is:

1. In metering pump apparatus for delivering a metered amount of lubricating fluid from a pressurized fluid reservoir to a lubricating fluid delivery line for lubricating a chain conveyor during a lubrication cycle, the improvement comprising:

a metering pump with a pump body having an elongated chamber and piston means in said chamber including a movable piston, said piston means sealingly dividing the chamber into a pumping chamber at one end and a priming chamber at the other end;

spring bias means urging said movable piston away from said pumping chamber and towards said priming chamber;

first check valve means interconnecting the metering pump pumping chamber to the lubricating fluid delivery line for enabling the flow of lubricating fluid in only one direction outwardly from the pumping chamber;

a three-way actuable fluid valve including an inlet, an outlet, and an intermediate port, with the fluid valve inlet connected to said pressurized fluid reservoir for receiving the lubricating fluid under pressure, and the fluid valve outlet connected to the metering pump priming chamber;

second check valve means connected to the metering pump pumping chamber for enabling the flow of lubricating fluid in only one direction inwardly into the pumping chamber; and a conduit interconnecting the second check valve means to the actuable fluid valve intermediate port;

said actuable fluid valve upon actuation delivering the pressurized lubricating fluid to said priming chamber to force said piston towards said pumping chamber and thereby deliver a shot of lubricating fluid from said fluid delivery line during a lubrication cycle, and said spring bias means upon deactuation of said actuable fluid valve at the end of the lubricating cycle, urging said piston away from said pumping chamber and towards said priming chamber to deliver lubrication fluid in said priming chamber through said intermediate port, conduit and second check valve into said pumping chamber to prime the metering pump pumping chamber for the next lubrication cycle.

2. Metering pump apparatus according to claim 1, including a return fluid line interconnecting said conduit to said fluid reservoir, and wherein said spring bias means at the end of said lubrication cycle enables simultaneous priming of said pumping chamber while diverting lubricating fluid from the actuable fluid valve to the fluid reservoir to substantially eliminate dripping of lubricating fluid from the fluid delivery line at the end of the lubricating cycle.

* * * * *